INVENTORS
PAUL P. DAY
RALPH B. ALLNUTT
A. B. STAVOVY
BY
Albert Agg
AGENT.

INVENTORS
PAUL P. DAY
RALPH B. ALLNUTT
A. B. STAVOVY

BY

AGENT.

United States Patent Office 3,196,677
Patented July 27, 1965

3,196,677
CYCLIC PRESSURE LOADING SYSTEM
Paul P. Day, Potomac, and Ralph B. Allnutt, Silver Spring, Md., and Alexander B. Stavovy, Springfield, Va., assignors to the United States of America as represented by the Secretary of the Navy
Filed Nov. 5, 1962, Ser. No. 235,587
23 Claims. (Cl. 73—148)
(Granted under Title 35, U.S. Code (1952), sec. 266)

The invention described herein may be manufactured and used by or for the Government of the United States of America for governmental purposes without the payment of any royalties thereon or therefor.

This invention relates to the measuring and testing of models and more particularly to the pressure testing of models.

A difficulty arises in the pressure testing of models in environmental pressure tanks or vessels because of the stresses and strains introduced on the pressure vessel itself. Such stresses and strains cause the environmental pressure vessel to fail due to material fatigue often long before the time or amount of use of said vessel has justified its usually high cost.

In known prior art arrangements, the model is subjected to varying pressure by means of varying pressure in the environmental pressure vessel, or by varying the pressure in both the model and the pressure vessel. In either case, due to sudden transients, the pressure vessel will be distended and contracted many times over a cycle or period of model testing, resulting in fatigue failure of the pressure vessel. Consequently, in prior art testing arrangements, a very heavy, expensive pressure tank must be employed so that the tank will resist all testing stresses to which it is to be subjected.

Accordingly it is among the objects of this invention to provide for pressure testing of models wherein the pressure in the pressure tank or vessel in which the model is placed remains substantially constant during a cycle of model testing.

Another object of this invention is to provide for pressure testing of models wherein only the pressure in the model is varied.

Yet another object of this invention is to provide for the programmed introduction of varying pressures into the model undergoing test.

Another object of this invention is to provide means for compensating for transient changes in the pressure of a test tank due to changes in volume of a model undergoing pressure testing therein as the result of varying pressures introduced to the model.

Another object of the present invention is to provide for the reliable, safe, economical and accurate pressure testing of models without requiring the use of heavy, expensive environmental testing tanks.

In carrying out the present invention a model or prototype of a body to be tested is placed inside a tank. The tank is coupled to a source of variable pressure one value of which is selected during the testing cycle of the model in a given range of pressure. For example, the tank pressure may be set at 1500 p.s.i., and the model then tested under control of a programmer through a range of from 100 p.s.i. to 500 p.s.i. and back to 100 p.s.i many times, so that the resulting differential pressures acting on the model vary from 1400 to 1000 p.s.i. Obviously, many cycles of testing of a model may be carried out over the same range of differential pressures until fatigue failure of the model results or until the testing is successfully ended.

During each testing cycle the change in pressure acting on the model will cause the model to change its size more or less depending upon the material and dimensions of the model. When, for example, the model volume increases, the pressure on the tank may be suddenly and sizably increased over the desired constant value at which it is set during a cycle. This sudden and sizable increase of tank pressure must be compensated for if the tank pressure is to be kept constant thereby avoiding undue stress resulting in tank fatigue failure, and if the difference in pressure between the tank and the model is to be maintained at a programmed value. Moreover, when the model undergoes changes in its volume (size), the pressure connections between the test tank and the model must be capable of compensatory movement to prevent undue strain thereon.

It is, therefore, a further object of the present invention to provide compensation controls and means to maintain constant or substantially constant the environmental test tank pressure and to provide means for preventing strain on any fluid connections between the tank and model.

For better understanding of the present invention, reference is made to the accompanying drawings in which like numerals represent like parts and in which.

Figure 1:
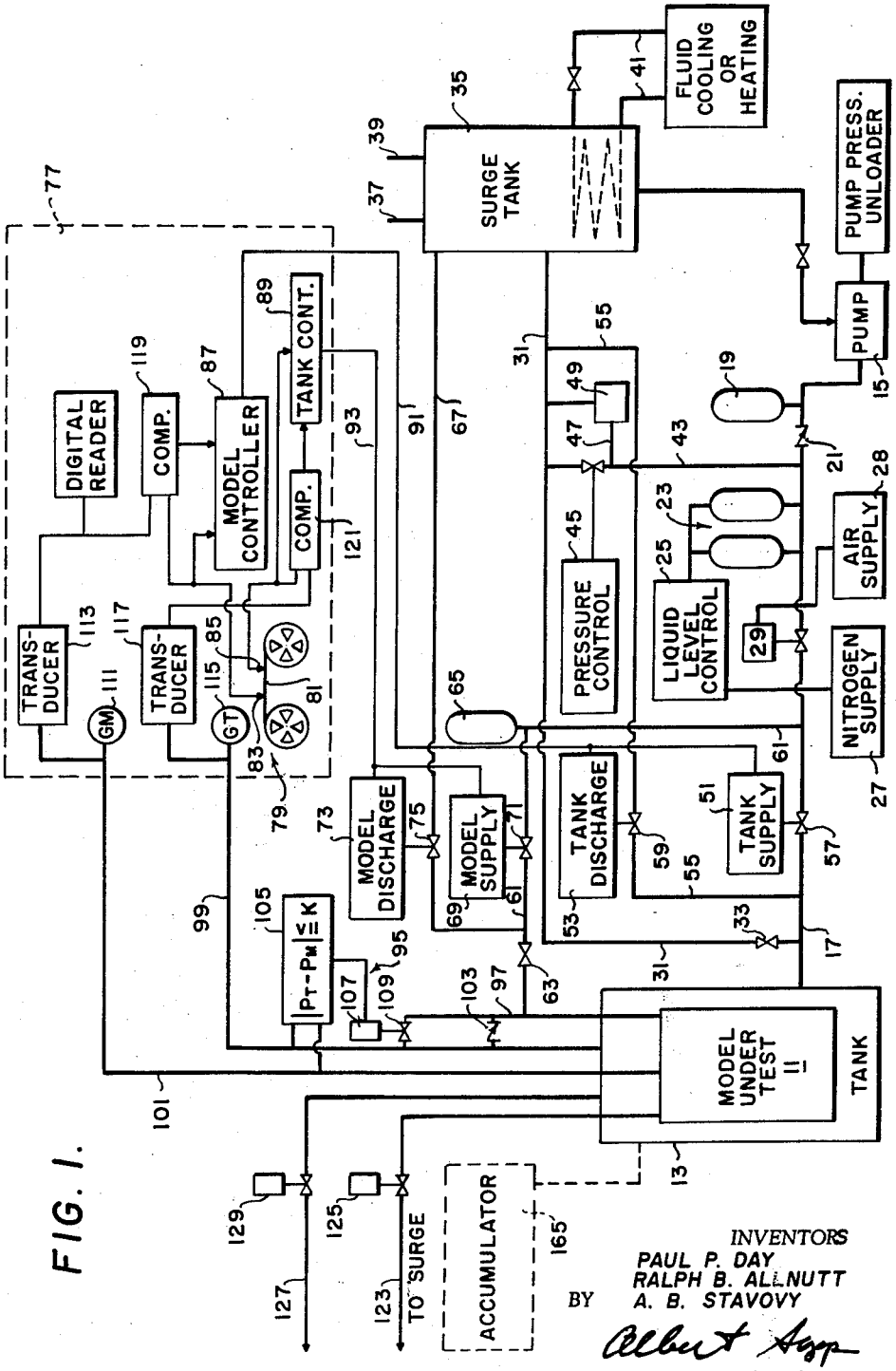
FIG. 1 is a schematic block diagram of an embodiment of the invention.

Referring to the block diagram of FIG. 1, a model or prototype 11 to be tested for fatigue failure under varying pressure conditions is placed inside a testing tank or vessel 13. The tank 13 need be only strong enough to withstand its operating pressures and slight transients. The tank 13 is fluidly coupled to any suitable pump 15 via a feed conduit 17. In order to insure a steady non-pulsating flow of fluid to the test tank 13, there is coupled to the conduit 17 a pulsation damper 19 and a check valve 21. An accumulator 23 controlled by a liquid level controller 25 drawing nitrogen or any other suitable gas from a supply 27 serves to control the pressure head on the conduit 17. A safety valve 29 operated by any suitable source of air supply 28 shuts off the supply of fluid until pump 15 can fill the accumulator to safe level. This prevents the loss of gas from the accumulators.

A discharge conduit 31 connected to the feed conduit 17 has a relief valve 33 to prevent over loading of the tank 13. The discharge conduit 31 is fluidly coupled to a surge tank 35 having a vent 37 and a liquid fill and overflow line 39. A cooling water line 41 controls the temperature of the surge tank 35. A line 43 connects the conduit 17 at a point between the check valve 21 and the accumulator 23 to the discharge line 31. A pressure control valve 45 is located on the line 43. When excess fluid is acquired, the pressure valve 45 opens and prevents the pump from unloading. This is desirable because of the resulting smoother flow of fluid.

A safety line 47 bypassing the pressure control valve 45 has a pressure relief valve 49 providing overall system relief.

The pressure in the tank 13 is controlled by means of a tank supply valve controller 51 and a tank discharge valve controller 53. The tank discharge controller 53 controls a valve 59 located in discharge line 55 connected to surge tank 35. The controller 51 controls a valve 57 in line 17. Both the controllers 51 and 53 may be of identical construction to operate the valves 57 and 59 respectively in a continuously variable manner responsive to correspondingly variable amounts of electrical voltage applied thereto. For example, each controller may include an electrohydraulic servo device for producing positive positioning of a valve stem. Any other suitable means may be used to variably actuate valve members.

The model 11 is connected to the feed conduit 17 by a model feed line 61. A safety relief valve 63 is located on the model feed line 61 for protecting the model from pressures causing too great a stress thereon. An accumulator 65 of any suitable conventional construction serves to control the pressure head on the line 61. A model discharge line 67 connects the feed line 61 to the surge tank 35. A model supply controller 69 controlling a valve 71 in the feed line 61, and a model discharge controller 73 controlling a valve 75 in the discharge line 67 serve to control the amount of pressure in the model 11. Both the controllers 69 and 73 may be of identical construction and identical to the tank supply and discharge controller 51 and 53 previously described.

A dynamic pressure control unit indicated generally within the dotted line rectangle 77 includes a programmer unit 79 for generating inputs to the model and tank controllers 51, 53, 69, and 73. Although the programmer 79 may be of any suitable design, there is employed in the embodiment of the invention shown in FIG. 1, a multiple track tape 81 and respective track readout heads 83 and 85 for the model and the tank respectively. The tape 81 may have recorded thereon any suitable signals which may be translated into step-or slope-varied voltages by means of any suitable translator, such as a conventional operational voltage amplifier or similar device. If desired, the program tape 81 may have recorded thereon pulse code signals which may be decoded by familiar conventional pulse decoding techniques to quantized voltage levels.

Apparatus for translating or decoding whatever desired particular signals are present on the program tape 81 into operational voltage output levels is located in a model controller 87 and a tank controller 89. The model controller 87 produces an output of a desired sequence of varying voltages, each sequence defining a test cycle of varying pressures which are to be introduced to the model 11. The output of the model controller 87 is connected via an electrical lead 91 to the model supply controller 69 and to the model discharge controller 73. The tank controller is similar to the model controller and a constant input is usually supplied thereto. The controller can be set at any desired tank pressure and it will automatically control valves 57 and 59 thru controls 51 and 53.

Any convenient suitable arrangement may be used to actuate the controllers 69 and 73 responsively to a sequence of input voltages. In one arrangement there may be employed in the model supply controller a detector responsive only to positive polarity voltages and in the discharge controller a detector responsive only to negative polarity voltages for energizing respective electro-hydraulic or mechanical valve actuators (e.g. solenoids, electric motors and the like). Alternatively, the model supply and discharge controllers may respectively be provided with positive and negative slope detectors. In still another arrangement, a single solenoid having its plunger connected at its opposing ends to the valves 71 and 75 may be actuated by the input voltage to close one valve while opening the other, and vice versa, to control the fluid flow in the lines 67 and 61 to feed and discharge the model 11.

The pressure of the test tank 13 may be controlled in a manner similar to that of the model, the output of the tank controller 89 being connected via a electrical lead 93 to the tank supply and discharge valve controllers 51 and 53 respectively. If it is desired that the tank pressure input be maintained at a substantially constant value during all cycles of model testing, a constant reference source (not shown) of any suitable design may be provided. Of course, the tank pressure input may be programmed as a constant value on its track on the tape 81.

In many cases it may be necessary as a precautionary matter to maintain the pressure in the model distinctly less than that in the tank at all times. This is especially true where the model being tested may explode due to model pressure exceeding tank pressure. The maintaining of tank pressure greater than model pressure is carried out by means of a passive safety valve system 95 connected among a model conduit 97 tank feedback conduit 99, and a model feedback conduit 101.

An equalizing check valve is connected between conduits 97 and 99 and is biased to maintain the model pressure below that of the tank 13. In order to positively maintain the model pressure $P_m$ at some constant value less than the tank pressure $P_t$, a differential pressure switch 105 of any suitable design, such as the Bourdon tube or diaphragm type, is connected between the tank feedback line 99 and the model feedback line 101. When the pressure differential $P_t - P_m$ between the model and tank reaches and tends to go beyond a selected constant value K, the differential pressure switch actuates a valve control unit 107 for opening a valve 109 connecting the lines 97 and 99 thereby coupling the tank and model fluid. Thus, with the valve 109 open, the pressure in the tank tends to approach that of the model. The two pressures will continue to equalize until there is insufficient difference in pressure between the model and the tank to operate the differential pressure switch 105. Of course, if desired, the tank pressure may be maintained at a value less than that of the model in cases where it is desired to test the model against internal pressure.

The feedback line 101 also connects the model 11 to a gage 111 and to a line-pressure-sensitive transducer 113 of any suitable design located in the dynamic pressure control unit 77. The tank feedback line 99 connects the tank 13 to a tank pressure gage 115 and to a suitable pressure sensitive transducer 117 also located in the unit 77. Each of the transducers 113 and 117 produces an electrical voltage output of scale corresponding to the electrical voltage outputs of the controllers 87 and 89 to thereby provide corrective feedback control voltages for the model and tank controllers. The model transducer feedback is fed to a comparator 119 of conventional design. The output of model readout head 83 is supplied to both the comparator 119 and the model controller 87. In the comparator 119 the feedback voltage output of the transducer 113 is compared with (i.e., subtracted from) the programmed output of the head 83 to produce an output error voltage. This output error voltage may then be inverted and fed to the model controller 87 to be combined with the readout voltage from the head 83 so that a corrected voltage input is supplied to the supply and discharge controllers 69 and 73 for adjustably varying the pressure $P_m$ in the model until the programmed pressure value is obtained. Alternatively, the output of the comparator may be coupled directly to the feed and discharge controllers for direct control thereof by the inverse of the error output voltage.

A similar feedback correction circuit is shown provided for the tank 13, although in some instances this will not, as a practical matter, be necessary. A comparator 121 receives inputs from the tank readout head 85 and the tank pressure transducer 115, and the output of the head 85 is also supplied to the tank controller 89. The tank supply and discharge controllers 51 and 63 then variably adjust the tank pressure $P_t$ until it agrees with the desired or programmed input value.

Figure 3A:
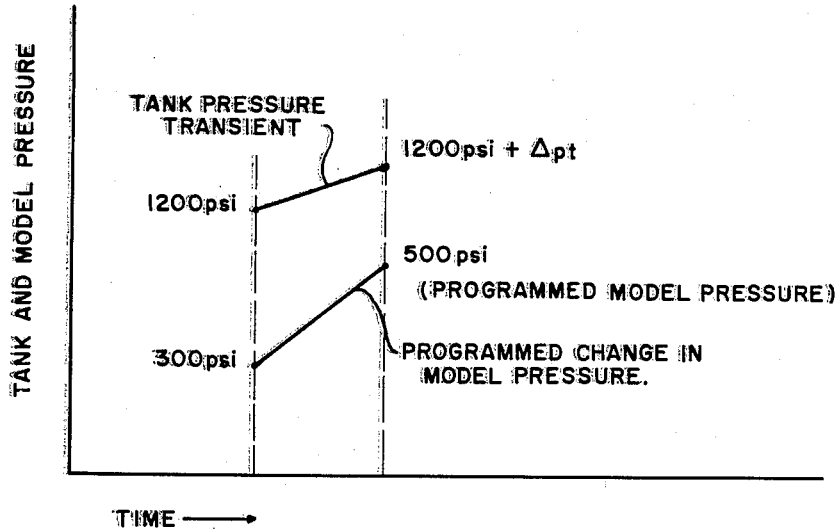

The foregoing feedback arrangement provides a system correction in the following manner:

Assume that during a testing cycle the tank is to have a set pressure of 1200 p.s.i. and the model is to have its pressure raised from 300 p.s.i. to 500 p.s.i. In other words, these pressures are the programmed values read from the tape 81 and are represented by the appropriate corresponding voltage amounts fed to the leads 91 and 93 respectively. As the pressure in the model 11 increases, and the tank pressure remains constant, the differential pressure decreases from 900 p.s.i. to 700 p.s.i. Under these conditions, as shown in the graph of FIG. 3a, the volume of the model in the tank 13 may increase relatively to the volume of the tank so that the actual instantaneous pressure differential is different from the programmed differential. Thus, the tank pressure may tend to rise suddenly to a transient value over 1200 p.s.i. According to the invention it is highly undesirable for the tank pressure to change during a test cycle. Therefore, when the slightly higher tank pressure is fed back to the transducer 117 and compared with the set tank pressure, the resulting error voltage is superimposed inversely on the output voltage so that the tank discharge valve 59 returns the tank pressure to exactly 1200 p.s.i. It has been found in practice that the feedback correction may be applied sufficiently fast to maintain the tank pressure within a maximum of plus or minus one percent of the maximum working pressure of the tank.

Figure 3B:
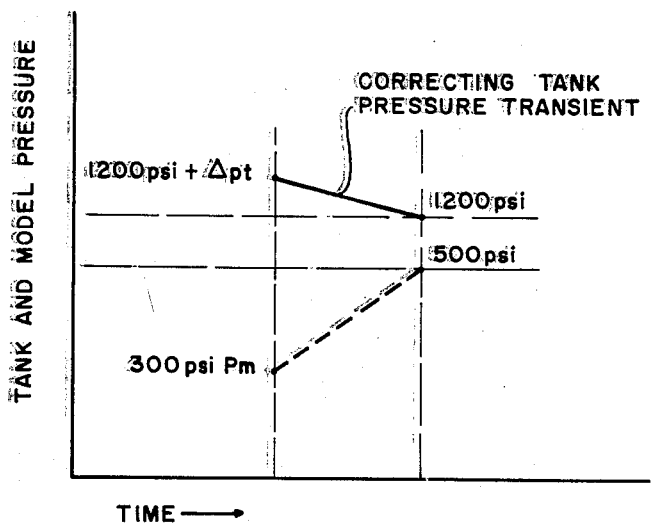

It will be seen that when the tank pressure is corrected to its set value, this as well as the change in model volume will have an effect on the actual model pressure, $P_m$, which, as shown in FIG. 3b will tend to be decreased, since the model volume has increased. Consequently, the programmed pressure of 500 p.s.i. on the model may not quite be reached unless a feedback correction is applied to the model. This procedure of feedback correction results in the inherent convergence of the actual pressures to the programmed pressures.

The actual pressure in the model 11 is thus fed back via line 101 to the pressure sensitive transducer 113 and, in the same manner as described in conjunction with the tank feedback correction, compared and combined in any suitable manner with the programmed model pressure voltage output to produce an error voltage to be applied to the model supply controller 69 of discharge controller 73.

Although it is preferred that liquid such as oil or water be employed as the pressure medium in the present system, air or any suitable gas may be used. However, where liquid is used, it is necessary to bleed off any air trapped in the model and tank prior to and after commencement of the cyclical testing. A model bleed line 123 having a solenoid or manually controlled air bleed valve 125, and a tank bleed line 127 having a solenoid or manually controlled air bleed valve 129 are connected respectively to the model 11 and the tank 13. These bleed valves can be opened automatically at timed intervals or at any desired time. Prior to testing, the liquid is pumped into the tank and model until liquid appears at the bleed valves 129 and 133. Liquid may then be pumped under pressure into the tank and model for testing without worry of spurious test results which would be caused by trapped air in the system.

Figure 2:
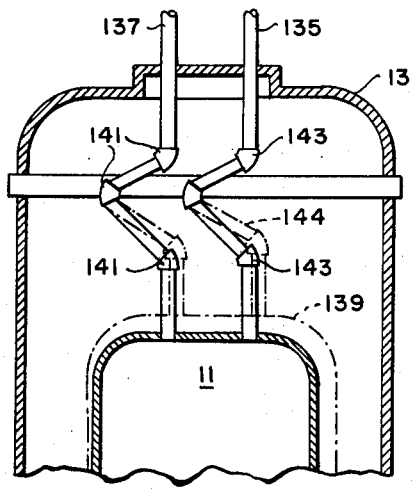
FIG. 2 is a modified cross-sectional view of the tank and model arrangement of the invention.

Because there will be relative movement due to varying pressure differentials between the model 11 and the tank 13 when a model is undergoing testing, it is necessary to provide for movement in the conduits passing through the test tank 13 to the model. As shown in FIG. 2, conduits 135 and 137 represent lines which are rigidly joined to the tank 13 for maximum sealing efficiency and which are fluidly coupled from outside the tank to the model 11. The dashed lines 129 represent in an exaggerated manner the relative position of the model walls when for example, the pressure differential between tank and model is much lower than a previous differential. Obviously, this lower differential in pressure or lower model and tank pressures together, will cause some expansion in the volume and therefore the size of the model. This expansion is taken up by means of swivel joints 141 and 143 in the respective lines 137 and 135. High pressure swivel joints are known in the art and do not form part of the present invention in and of themselves. However, the provision of swivel joints or equivalent means such as a high pressure hose or bellows is necessary as a practical matter in carrying out the present invention. The dashed lines 144 indicate the positions of the lines 137 and 135 when the model has expanded relatively in the tank 13. Of course, any slight changes occurring in tank dimensions, although undesirable, would be taken up in a similar manner.

Figure 4:
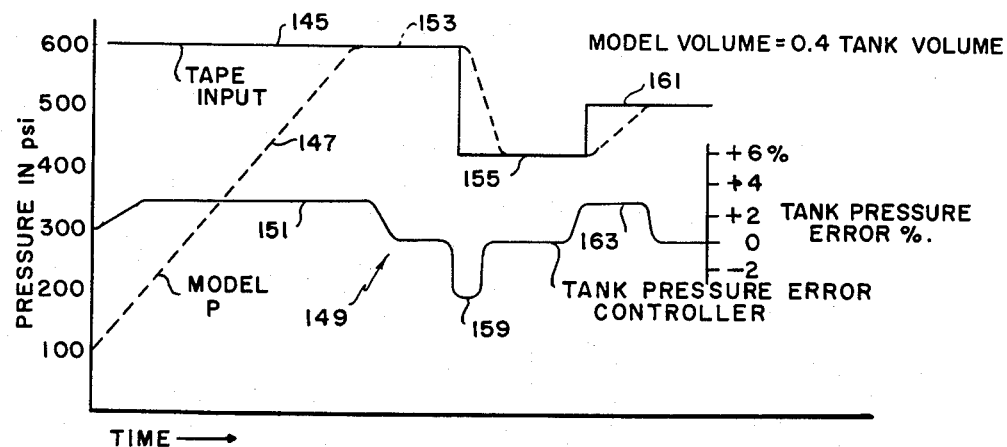
FIG. 3, 3a and FIG. 4 are graphic diagrams illustrating the operation of the present invention.

Reference is now made to FIG. 4 as an aid in explaining the operation of the foregoing described embodiment of the invention. It will be assumed, as indicated in FIG. 4, that the initial model volume is 0.4 that of the tank. The ordinate axis indicates the pressure in p.s.i., and the abscissa, time. The solid line 145 indicates the input pressure to the model 11 which is generated by the programmer as a voltage or other electrical quantity corresponding to the desired pressure value. The dashed line 147 represents the actual build up of pressure or the value of the fed back pressure, in the model 11 as a result of the command input signal from the programmer. Of course, as seen by the slope of the dashed line 147, due to inherent resistance to flow in the system, there is a delay between the input command pressure from the programmer and the reaching of this pressure in the model 11.

The curve 149 represents the error output signal of the comparator which is produced as a result of the effect of changes of model pressure and, therefore, model volume, on the tank pressure. A raised portion 151 of the curve 149 represents the error correction for the transient change in pressure produced in the tank when the model pressure is changed from 100 to 600 p.s.i. as indicated in FIG. 4. The error voltage at curve portion 151 is seen to increase, thereby indicating that the tank pressure has increased. Accordingly, this error voltage, or its inverse, may be applied from the output of the tank controller 89 to the tank discharge controller 53 to open the discharge valve 59, thereby reducing the pressure in the tank to its desired constant reference or programmed value—here indicated as 300 p.s.i.

A flat portion 153 of the curve 145 represents the holding of the model pressure at its desired program value for an interval of time, say, several seconds. This interval of time may be varied in the programmer by providing, for example, a suitable timer which is actuated in response to a zero output error voltage between the program voltage and the feedback voltage compared in the model controller 87.

When the program model pressure is reduced to the value indicated by the curve portion 155 (the actual or fed back model pressure lagging therebehind as indicated by the dashed line portion 147) the tank pressure error voltage drops to a lowered portion 159 indicating that more pressure must be added to the tank so that it is kept at its desired constant reference or programmed pressure—300 p.s.i. Accordingly, this error voltage is applied to the tank supply controller 51 for opening the supply valve 57 thereby supplying more high pressure liquid to the tank. And in a similar, but opposite manner, when the model pressure is raised to a value indicated by the portion 161 of the curve 145, a tank error voltage 163 is produced, the inverse of which may be applied to the tank discharge valve 59 to be opened for returning the tank 13 to its desired set pressure.

It is to be understood that when the ratio of the volume of the model to that of the tank is quite small, for example, about 0.2 or less, changes in model volume during cyclic pressure loading thereof will have appreciably less effect on the pressure loading of the tank. Consequently, in these situations, if the material strength of the tank is sufficient, no active means need be used for pressure compensation of the tank. Thus, only the pressure of the model is cyclicly varied in carrying out testing in these circumstances, and no feedback compensation is fed to the tank.

When the pressure of only the model is being varied or adjusted, it may be desirable to employ some tank compensation means such as an accumulator (indicated by dashed line rectangle 165 in FIG. 1) fluidly coupled to the tank. While the employment of an accumulator such as 165 will serve to decrease somewhat the effect of transients on the tank 13 where the model to tank volume ratio is low, it does not operate efficiently in situations of large model to tank volume ratio.

Obviously many modifications and variations of the present invention are possible in the light of the above teachings. It is therefore to be understood that within the scope of the appended claims the invention may be practiced otherwise than as specifically described.

What is claimed is:

1. The method of dynamically pressure testing a model in a closed environmental test tank comprising the steps of:
    maintaining the closed environmental test tank at an essentially constant pressure substantially higher than atmospheric pressure;
    and introducing varying pressures only in the model to thereby produce varying differential pressure loading on the model.

2. The method of dynamically pressure testing a model in an environmental test tank comprising the steps of:
    maintaining the environmental test tank at an essentially constant pressure;
    introducing varying pressures only to the model to thereby produce varying differential pressure loading on the model; and
    compensating the pressure of the tank for any transients which may be produced therein as a result of volume changes of said model produced by changes in pressure loading of the model.

3. The method of dynamically pressure testing a model in an environmental test tank comprising the steps of:
    supplying the test tank with an essentially constant pressure;
    introducing varying pressures only to the model;
    measurably sensing the pressure of the test tank;
    comparing said measurably sensed tank pressure with said essentially constant supply pressure; and
    modifying said supply pressure to reduce any difference between the supply pressure and the measurably sensed pressure of the tank, whereby the tank pressure is maintained at a desired essentially constant value despite any transient pressures which may be produced by changes in the volume of the model due to varying pressures introduced thereto.

4. In a dynamic pressure testing system wherein a model located in an environmental test tank is subjected to varying pressure loading from a fluid source, apparatus for maintaining the tank pressure at a predetermined essentially constant value despite pressure-induced volume variations of said model resulting in transient pressures in the tank, comprising:
    means coupled to the tank for controlling the pressure thereof;
    sensing means for directly sensing the pressure of the tank; and
    feedback compensation control means connected to said sensing means and to said means for correctively adjusting the tank pressure for return to its predetermined pressure.

5. An environmental pressure testing system for subjecting a model located in an environmental test tank to varying pressure loading conditions, comprising:
    means for varying the amount of pressure in said model;
    control means for controlling the amount of pressure supplied to said tank;
    sensing means directly coupled to said test tank for measurably sensing the amount of pressure in said tank;
    comparison means coupled to said sensing means and to said control means for producing an output representative of the difference between the pressure in said tank and the supply pressure for said tank to thereby actuate said control means to reduce said difference to obtain an actual tank pressure equal to the amount of pressure supplied.

6. The system as defined according to claim 5 but further characterized by said means for varying the pressure of said model comprising a programmer for producing a control output, and fluid pressure control means responsive to said output for varying the fluid pressure in said model.

7. The system as defined according to claim 5 but further characterized by valve means connecting said tank and model for prohibiting the pressure of the model from exceeding the pressure of the tank, whereby explosion of the model therein is prevented.

8. An environmental pressure testing system wherein a model located in an environmental test tank is subjected to variable pressure load conditions from a variable pressure supply of fluid comprising:
    means for supplying fluid from the fluid source to the testing tank at essentially constant pressure;
    means for supplying fluid from the fluid source to the model at variable pressure during a test cycle;
    and compensation control means for varying the pressure of the test tank to compensate for variations in the tank pressure caused by changes in model volume due to changes in pressure loading thereof.

9. The system as defined according to claim 8 but further characterized by said compensation means comprising an accumulator coupled to said test tank.

10. The system as defined according to claim 8 but further characterized by said compensation means comprising a feedback loop producing an output corresponding to the difference between the actual pressure in said test tank and the pressure supplied thereto, and control means responsive to said output for varying the fluid pressure supplied to the tank in a direction to ultimately reduce said difference to zero in the direction of the value of the essentially constant pressure supplied.

11. The system as defined according to claim 8 but further characterized by said fluid comprising a liquid.

12. A dynamic cyclical pressure loading system for testing a model located in an environmental testing tank comprising:
    a source of fluid under pressure;
    conduit means for supplying the fluid to the model and to the tank;
    a programmer for producing a cyclical schedule of outputs corresponding to desired amounts of pressure to be supplied to said model;
    control valve means located in said conduit means for varying the amount of pressure supplied to said model responsive to the output of said programmer;
    control means coupled to said conduit means for supplying fluid from said source at essentially constant pressure to said tank;
    pressure sensitive transducer means coupled to said test tank for producing an output representative of the actual pressure in said tank;
    comparison means coupled to said transducer means and to said control means for producing an output representing the difference between the amount of pressure supplied to said tank and the measured pressure thereof;
    and means for applying the output of said comparison means to said control means for modifying the output of said control means to vary the pressure of the test tank in a direction to obtain said essentially constant pressure so that said difference ultimately becomes zero.

13. The system as defined according to claim 12 but further characterized by valve means connecting the tank and model for maintaining the pressure of the model at least less than that of the tank.

14. The system as defined according to claim 12 but further characterized by said fluid comprising a liquid.

15. The system as defined according to claim 12 but further characterized by said fluid comprising a gas.

16. The system as defined according to claim 14 but further characterized by bleed valve means connected to said tank and to said model for periodically removing trapped gas from the system.

17. A dynamic cyclical pressure loading system for testing a model located in a closed test tank comprising:
    means for maintaining the closed test tank at an essentially constant pressure substantially higher than atmospheric pressure;
    and means for varying the pressure of said model;
    whereby the model is loaded with varying differential pressures.

18. The system as defined according to claim 17 but further characterized by both said means comprising fluid means.

19. The system as defined according to claim 17 but further characterized by both said means comprising liquid means.

20. A dynamic cyclical pressure loading system for testing a model located in a test tank comprising:
    means for maintaining the test tank at an essentially constant pressure;
    said means comprising compensation control means for adjusting the pressure of the tank to compensate for transients thereof produced by changes in model volume caused by changes in pressure loading of the model;
    and means for varying the pressure in said model.

21. A dynamic cyclical pressure loading system for testing a model located in an environmental test tank, comprising:
    a source of fluid under pressure;
    a surge tank;
    first and second feed conduit means connecting said fluid source to said tank and model respectively;
    first and second discharge conduit means connecting said model and tank respectively to said surge tank;
    model pressure control means connected to said feed and discharge conduits of the model;
    tank pressure control means connected to said feed and discharge conduits of the tank;
    a programmer for producing outputs for controlling said model pressure control means to vary the pressure in said model;
    pressure setting means coupled to said tank pressure control means for causing an essentially constant predetermined amount of pressure to be supplied to the test tank;
    and compensation means coupled directly to said test tank for adjusting the tank pressure toward its essentially constant predetermined value in a manner to compensate the tank pressure for transients therein produced by changes in model volume due to changes in model pressure loading.

22. The system as defined according to claim 21 but further characterized by said compensation means comprising an accumulator coupled to said test tank.

23. The system as defined according to claim 21 but further characterized by said compensation means comprising pressure-sensitive transducer means coupled directly to said test tank for measuring the pressure thereof; comparison means connected to said pressure-sensitive transducer means and to said pressure setting means for producing an output representing the difference between the measured pressure of said test tank and the predetermined pressure set by said pressure setting means, and means coupling said comparison means to said pressure setting means for adjusting the output of the pressure setting means to compensate the tank pressure for said transients thereof.

References Cited by the Examiner

UNITED STATES PATENTS

| | | | |
|---|---|---|---|
| 2,725,742 | 12/55 | Crooks | 73—88 X |
| 2,754,677 | 7/56 | New | 73—37 |
| 2,893,236 | 7/59 | Coon et al. | 73—4 |

RICHARD C. QUEISSER, *Primary Examiner.*

DAVID SCHONBERG, *Examiner.*

UNITED STATES PATENT OFFICE
CERTIFICATE OF CORRECTION

Patent No. 3,196,677                              July 27, 1965

Paul P. Day et al.

It is hereby certified that error appears in the above numbered patent requiring correction and that the said Letters Patent should read as corrected below.

In the drawings, Sheet 1, FIG. 1, the electrical lead 91 should be connected to Model Supply Controller 69 and Model Discharge Controller 73 instead of being connected to Tank Supply Valve Controller 51 and Tank Discharge Valve Controller 53; same FIG. 1, the electrical lead 93 should be connected to Tank Supply Valve Controller 51 and Tank Discharge Valve Controller 53 instead of being connected to Model Supply Controller 69 and Model Discharge Controller 73.

Signed and sealed this 26th day of April 1966.

(SEAL)
Attest:

ERNEST W. SWIDER                              EDWARD J. BRENNER
Attesting Officer                                     Commissioner of Patents